UNITED STATES PATENT OFFICE 2,446,897

PROCESS FOR POLYMERIZING OLEFINIC COMPOUNDS WITH METAL HALIDE-ORGANIC ACID DOUBLE SALTS

David W. Young, Roselle, and Henry B. Kellog, Union City, N. J., assignors to Standard Oil Development Company, a corporation of Delaware No Drawing. Application December 24, 1942, Serial No. 470,030

4 Claims. (Cl. 260—91)

This application relates to polymeric materials, relates particularly to low temperature Friedel-Crafts catalysts; and relates especially to double salts of Friedel-Crafts metal halo organic compounds in solution in low-freezing, non-complex-forming solvents.

Various of the Friedel-Crafts type catalysts including boron trifluoride and aluminum chloride have been used as low temperature polymerization catalysts for olefinic materials and very valuable polymeric bodies have been produced thereby. However, these catalysts are not wholly satisfactory because of the rapid activity of some such as $AlCl_3$, and the low solubility of it and others such as boron trifluoride.

The present invention provides a new Friedel-Crafts type catalyst of good potency and good solubility. The catalyst consists of double salts of halo organic acids such as the chloro acetates, the chloro formates and the chloro propionates of the metals used in Friedel-Crafts catalysts such as aluminum, indium, titanium, boron, zirconium and the like. Hereafter, for the purpose of the description of this invention, the metals used in Friedel-Crafts catalysts are described as "Friedel-Crafts metals."

Thus the invention produces a low temperature polymer of an iso-olefin or diolefin or a mixture of olefins by the application thereto at low temperature of a halo organic acid salt of a Friedel-Crafts metal, either in solid form or in liquid form or the catalyst may be used in solution in a convenient solvent to yield a high molecular weight polymer. Other objects and details of the invention will be apparent from the following description:

In practicing the invention, the catalyst is conveniently prepared by the interaction of the Friedel-Crafts catalyst with an organic acid such as acetic acid or formic acid or propionic acid, or the like, a metathetical reaction occurring of the type set out in the following equation:

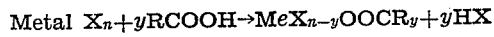

in which $n$ may be 2 to 5 and $y$ may be 1 to 4, but at least one less than $n$ in any given equation; Me is any Friedel-Crafts type metal and X any halide. R represents H, or an organic radical having up to 5 carbon atoms.

These compounds are readily prepared merely by mixing together the Friedel-Crafts halide with the organic acid and boiling out the hydrogen halide. Any of the lower organic acids from 1 to about 6 carbon atoms are useful depending upon the degree of speed of action desired in the finished catalyst. It may be noted that the precise compositions of these substances may vary depending chiefly upon variations in the amounts of halide and acid used in their preparation. A titanium catalyst prepared as above indicated with acetic acid is a solid at room temperature which shows a relatively high solubility in many organic solvents. It is readily soluble in such solvents as the organic mono- and polyhalides having from 1 to about 5 carbon atoms, in carbon disulfide, in various of the lower hydrocarbons and the like.

These catalysts are particularly valuable for the polymerization of olefinic materials such as isobutylene, styrene, mixtures of isobutylene and diolefins, and the like, at low temperatures, vinyl acetate, and the like, at room temperatures, or higher temperatures and many other olefinic materials. The temperature of polymerization may range from about +80° C. down to temperatures below 0° C. and as low as −160° C. and the polymerizable material may consist of the pure olefins or various mixtures in almost any proportion; and a wide range of polymers is obtainable, the characteristics varying from those of moderately heavy oil through the very thick heavy sticky oils to elastic solids and even to more or less brittle solids.

The invention will be thoroughly understood from the following examples, which are given for the sake of illustration only, and from the subsequent description.

As before stated, the catalyst of the present invention is prepared by reacting together a Friedel-Crafts halide with an organic acid of not more than about 5 or 6 carbon atoms. An illustration of the procedure is shown by the following equations indicating the reactions between titanium chloride and glacial acetic acid:

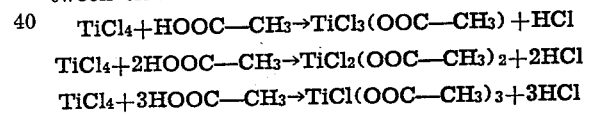

It may be noted that titanium acetate as such is not useful as a catalyst in this procedure.

Example I

In preparing a catalyst according to the present invention, 120 parts by weight of glacial acetic acid were cooled to approximately 10° C. in a convenient container, and 188 parts by weight of titanium tetra chloride were added slowly to the mixture with rapid stirring. The reaction was found to be exothermic and the temperature of the reaction mixture increased to a temperature somewhat above room temperature. When the reaction was substantially complete, the resulting solution was heated to about 70° C. for a few minutes to expel the last of the hydrogen chloride. The solution was then cooled to room temperature and a large crop of yellow crystals of the titanium chlor acetate was obtained. These crystals were the titanium dichlor diacetate ($TiCl_2AC_2$). The liquid obtained at the end of the reaction was mainly melted titanium dichlor diacetate admixed with a small excess of acetic acid and upon cooling to room temperature, the titanium dichlor diacetate crystallized and separated from a small amount of residual liquid which is readily decanted leaving behind the nearly pure crystals of the catalyst.

A mixture was prepared consisting of 100 parts by weight of isobutylene in liquid form and 200 parts by weight of liquid ethane. The equilibrium temperature of the mixture was approximately minus 86° C. To this cold mixture there was then added approximately 5 parts per 100 of mixture of titanium dichlor diacetate. No reaction occurred. To this mixture there was then added a substantial amount of solid carbon dioxide. The liquid ethane evaporated and the temperature of the remaining isobutylene then rose to the temperature of solid carbon dioxide at approximately —78° C. At this temperature also no reaction occurred. When the solid carbon dioxide was completely evaporated, the temperature of the liquid isobutylene rose slowly to a temperature of —30° C. At this temperature the solid form of the titanium dichlor diacetate is soluble in liquid isobutylene. The dissolved catalyst in the isobutylene caused a polymerization reaction to occur at the temperature of —30° C.; the heat of reaction raising the temperature rather rapidly. The reaction yielded a viscous polymer of isobutylene having a molecular weight of approximately 5000 (as determined by the Staudinger method).

This polymer was then brought up to room temperature to remove the residual volatile components and was washed with water to hydrolyze and remove the catalyst. It was then dissolved in a good grade of light lubricating oil. This solution was found to be a valuable lubricant having a viscosity index of 122, a Saybolt Universal viscosity of 210° F. of 68.4.

*Example II*

25 parts by weight of styrene were dissolved in 25 parts by weight of methyl chloride and the mixture was cooled with solid carbon dioxide. When a temperature of —40° C. had been reached, 0.5 part by weight of titanium chlor acetate ($TiCl_2AC_2$), as above described, were added to the mixture with rapid stirring. With a few seconds a slurry of white crystals appeared in the mixture. To the mixture there was then added 20 parts by weight of isopropyl alcohol to inactivate the catalyst and precipitate any dissolved polymer. The polymer had a molecular weight of approximately 40,000 and was found to be a clear, thermoplastic resin of good strength and durability.

*Example III*

A mixture was prepared consisting of 99 parts of isobutylene with 1 part of isoprene by weight together with 300 parts by weight of powdered solid carbon dioxide. When the temperature of the mixture was reduced to about —75° C., 6 parts by weight of a saturated solution of titanium chloracetate ($TiCl_2AC_2$) in carbon disulphide were added. This solution contained approximately 2% of the titanium chlor acetate. At this temperature the polymerization reaction proceeded relatively slowly and a small quantity of solid polymer was obtained. However, when the solid carbon dioxide was substantially all volatilized and the temperature raised to approximately —55° C., the reaction became very vigorous and a large quantity of polymer formed immediately. This polymer mixture was treated with isopropyl alcohol as in Example II. The polymer was then washed with water and dried and found to have a molecular weight of approximately 20,000.

*Example IV*

99 parts by weight of liquid isobutylene and 1 part by weight of isoprene were mixed and cooled to approximately —75° C. with solid carbon dioxide. 6 parts by weight of a saturated solution of titanium chlor acetate ($TiCl_2AC_2$) in methyl chloride were then added to the cold mixture. As before, relatively little reaction occurred until a temperature slightly above —50° C. was reached. At this point a vigorous reaction occurred to yield a considerable quantity of solid polymer which was found to have a molecular weight of approximately 40,000. This polymer was found to be reactive with sulfur in a typical curing reaction such as occurs with the interpolymers of isobutylene and a diolefin to yield a solid having a good tensile strength, a good elongation and other valuable characteristics associated with rubber-like bodies.

Other experiments show that this reaction proceeds equally well with butadiene and the substituted butadienes generally from 4 to 6 up to 12 or 14 carbon atoms per molecule, and proceeds advantageously in practically any proportion of iso-olefin to diolefin, with any iso-olefin up to 7 or 8 carbon atoms per molecule. With a major proportion of iso-olefin and a minor proportion of diolefin, high-grade rubber substitutes are obtained which are reactive with sulfur in a curing reaction to develop an elastic limit and a good tensile strength. The mixtures of minor proportions of isobutylene with major proportions of the diolefin yield a material which is less rubbery in character and more nearly a thermoplastic resin.

*Example V*

A mixture consisting of approximately 99 parts by weight of liquid isobutylene and 1 part by weight of isoprene was prepared and cooled to a temperature of approximately —75° C. A catalyst was simultaneously prepared consisting of the titanium chlor acetate ($TiCl_2AC_2$) dissolved in thiophosgene. Approximately 6 parts by weight of this solution were then added to the cold olefinic mixture. A prompt reaction occurred to yield an interpolymer having a molecular weight of approximately 40,000 and in general the characteristics of the polymer obtained from Example IV.

This procedure is particularly valuable for preparing low temperature olefinic polymers having molecular weights below about 40,000. The catalysts also are particularly valuable for preparing polyisobutylene of about 800 molecular weight in the absence of diluents or catalyst poisons for the production of medium oils.

It may be noted that several different forms of this catalyst may be prepared, as indicated by the general equation above set out. Also it is not necessary that a single pure form be used, but a mixture of several of the possible forms is equally useful; and this applies to all of the forms which may be used without regard to the Friedel-Crafts metal, or to the organic acid. Considering the possible titanium acetates, an increase in the proportion of acetate modifies the catalyst to slow down the rate of the reaction produced. For example, titanium tetra chloride, TiCl₄ is a good catalyst, titanium trichlor mono acetate also is a good catalyst, titanium dichlor diacetate is a good catalyst; titanium mono chlor tri acetate is a relatively poor catalyst, and titanium tetra acetate shows practically no catalytic powers.

*Example VI*

1000 parts by weight of vinyl acetate were placed in a reactor equipped with a condenser and to the material there was then added 0.5 part of titanium chlor acetate in the form of TiCl₂OOC–CH₃. The mixture was then heated to the boiling point of the vinyl acetate and the vapors condensed by the condenser and returned to the reactor; for a period of two hours. Within 15 minutes of the beginning of boiling, a heavy viscous polymer was apparent in the reactor. At the end of 2 hours, the material was converted into a heavy viscous polymer. The polymer was dissolved in acetone and filtered to remove the catalyst. The acetone was then boiled out of the solution and upon cooling, the polymer solidified into a light amber-colored solid having a molecular weight of approximately 20,000.

This use of a metal halo organic acid catalyst is unique because of the fact that vinyl acetate and analogous compounds ordinarily are powerful poisons for Friedel-Crafts type catalysts and do not polymerize with such catalysts.

*Example VII*

A catalyst was prepared by dissolving 5 parts by weight of titanium chlor acetate (TiCl₂AC) in 40 parts by weight of dry carbon disulphide. To this solution there were then added 100 parts by weight of methyl chloride, the solution being rapidly stirred during the addition of the methyl chloride.

Meantime, liquid isobutylene was cooled to −78° C. by means of Dry Ice packed around a reactor containing the liquid isobutylene. When this low temperature was reached, an amount of the catalyst in solution in mixed carbon disulphide and methyl chloride equal to approximately 5% of the liquid isobutylene was added to the isobutylene in the reactor. The polymerization reaction proceeded immediately to yield a good polyisobutylene having a molecular weight of approximately 100,000.

*Example VIII*

A mixture was prepared consisting of approximately 99 parts by weight of isobutylene and 1 part by weight of isoprene. This mixture was cooled in a reactor to a temperature of approximately −100° C. by the application of a jacket of liquid ethylene to the reactor. To the olefinic mixture there was then added approximately 5% of its weight of the catalyst prepared as in Example VII. A high-grade interpolymer was obtained having a molecular weight of approximately 30,000. This material was found to be reactive with curing agents and accordingly it was compounded by the following recipe:

| | Parts |
|---|---|
| Polymer | 100 |
| Carbon black | 50 |
| Stearic acid | 3 |
| Zinc oxide | 5 |
| Paraquinone dioxime | 2 |

This compound was prepared upon the open roll mill, the polymer being sheeted out on the mill and the other solid components added slowly and mixed in by cutting the sheet back and forth across the face of the mill.

This material was then placed in a mold, cured for 60 minutes at 270° F. to yield a cured product, having good physical properties.

*Example IX*

A mixture of liquid isobutylene and liquid propane was prepared in the proportion of approximately 100 parts of liquid isobutylene with approximately 300 parts of liquid propane. The temperature of this mixture under atmospheric pressure was approximately −30° C. To this mixture there was then added a solution of titanium dichlor diacetate in methyl chloride having a concentration of approximately 2%. A polymerization reaction proceeded promptly to yield a polymer of isobutylene in approximately 95% yield having a molecular weight between 10,000 and 20,000, as determined by the Staudinger method.

*Example X*

Other organic salts than the acetate are similarly conveniently useable, the formate in particular is convenient. A mixture was prepared consisting of 98 parts of isobutylene and 2 parts of isoprene in liquid form together with approximately 40 parts of solid carbon dioxide. This mixture was placed in a heat insulated container and agitated by a power stirrer and the temperature brought down to approximately −78° C. Simultaneously a catalyst was prepared consisting of titanium trichlor mono formate by the reaction above indicated and a portion of the solid double salt was dissolved in methyl chloride to yield a solution containing approximately 0.7 gram per 100 ml. This catalyst solution was added in a slow stream to the rapidly stirred olefinic mixture. The polymerization reaction proceeded promptly and the solid polymer precipitated as it was formed. The reaction was carried to a yield of approximately 72% of the amount of olefinic material. At this yield, the contents of the reactor were dumped into warm water to volatize out the residual olefins and to hydrolyze the catalyst. The solid polymer was collected and washed with alcohol and water.

The resulting polymer was found to have a molecular weight well above 30,000, and to have an iodine number in the approximate neighborhood of 2.

The polymer was then compounded on the open roll mill according to the following recipe:

| | Parts by weight |
|---|---|
| Polymer | 100 |
| ZnO | 5 |
| Sulfur | 2 |
| Cabot #9 carbon | 50 |
| Tuads | 1 |
| Captax | 0.5 |
| Stearic acid | 3.0 |

Samples of the compounded polymer were then placed in molds and cured for 20 minutes and 60 minutes at 307° F. Thereafter the tensile strengths and elongations were determined to yield the following inspection record:

| Mod. | Tensile | Elongation |
|---|---|---|
| 20 MINUTE CURE ||| 
| 384 | Lbs./sq. in. 2,030 | 810 |
| 60 MINUTE CURE |||
| 640 | 2,220 | 700 |

This material thus is a good synthetic substitute for natural rubber.

*Example XI*

A catalyst was prepared by adding to 2 molecular weights of acetic acid at a temperature of approximately 10° C., 1 M. W. of titanium tetrachloride. When the reaction was complete, the excess hydrogen chloride was driven out by gentle heating and the mixture was raised to a temperature of approximately 100° C. An equal weight of anhydrous aluminum chloride was then added to the liquid and held at 100° C. for 15 minutes. A reaction proceeded according to the following equation:

$$3AC_2TiCl_2 + 2AlCl_3 \rightarrow 2AC_3TiAlCl_4 + TiCl_4$$

Disproportionation may enter into this reaction. The titanium tetrachloride was removed by heating the material to a temperature within the range of 60° to 110° C. at 20 mm. of mercury pressure in order to boil out the titanium tetrachloride. The resulting product was a yellowish crystalline powder soluble in such solvents as paracymene, carbon disulfide, methyl chloride, and the like.

A solution of 1% of this solid catalyst in carbon disulfide was prepared and added in the proportion of approximately 1% of the catalyst solution to liquid isobutylene at a temperature of approximately −78° C. The reaction proceeded promptly to yield a polyisobutylene having a molecular weight of 127,300.

A similar reaction substantially the same as those in Examples I to VIII inclusive occurs similarly with other Friedel-Crafts catalyst including aluminum, zirconium, indium and the like, and similar double salt catalyst solutions. Those shown in Example IX can be prepared from any of the chlor acetates, chlor formates and chlor propionates mentioned in combination with boron trichloride or trifluoride, zirconium tetrachloride, antimony trichloride, ferric chloride, and the like.

The list of Friedel-Crafts catalyst with which this reaction may be conducted is well shown by N. O. Calloway in his article on the "Friedel-Crafts Synthesis" printed in the issue of Chemical Reviews published for the American Chemical Society at Baltimore in 1935, in volume XVII, Number 3, the article beginning on page 327, the list being particularly well shown on page 375. Also double salts may be prepared as in Example IX from substantially any pair of catalysts selected from the Calloway list; and the additional double salts may be prepared from any of those in the Calloway list plus most of the heavy metal halides.

It may be noted that among the advantages of this catalyst are the facts that they are less rapid than the halide Friedel-Crafts catalyst, substantially without sacrifice of the ultimate power or potency; and also the catalysts hydrolyze less easily, and are much more readily handled at room temperature.

The double salts are not limited to the chlor acetates but various of the other halides are also usable, and various other substances analogous to acetic acid are also usable, for instance, acetyl acetone, $CH_3-CO-CH_2-CO-CH_3$ forms complexes with titanium tetrachloride which are of a similar nature and similarly useful. The anolic form of acetyl acetone has a hydrogen atom which is replaceable by metals (using a covalency), and in the 1,6 position it has an oxygen atom which can be linked by its single pair of electrons, thus:

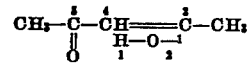

forms

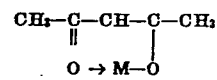

to yield a metal salt. By this reaction, complex acetylacetonates of many of the metals can be obtained. The acetylacetonates of titanium are particularly valuable and have been found to be active as catalysts for the low temperature polymerization of iso-olefin such as isobutylene. These double salts of titanium chloride with acetylacetone are, when fresh, soluble in many of the hydrocarbons, and they are effective to produce polyisobutylene of relatively very high molecular weight when small amounts of the catalyst substance either as such or in solution in carbon disulfide or in the alkyl halides or even in the hydrocarbons are added to the liquid iso-olefin or olefinic mixture at low temperatures. Tests indicate that the low M. W. acids form useful complexes. Above $C_7$ the acid complexes are not of value.

Thus there is above disclosed a series of organo halo complexes of Friedel-Crafts type metals which show a moderately high solubility in organic solvents and are powerful catalysts for the low temperature polymerization of olefins and olefinic mixtures.

While there are above disclosed but a limited number of embodiments of the process of the invention, it is possible to produce still other embodiments without departing from the inventive concept herein disclosed and it is therefore desired that only such limitations be imposed upon the appended claims as are stated therein or required by the prior art.

The invention claimed is:

1. In a process for the liquid phase polymerization of an olefinic organic compound selected from the group consisting of isobutylene, butadiene, isoprene and styrene to form high molecular weight polymerization products of viscous to solid consistency, the improvement comprising subjecting the said olefinic compound to conditions causing polymerization at a temperature between −30 and −160° C. in the presence of a catalyst which is dissolved in the reaction medium and which is a double salt of a metal chloride and a saturated mono-basic fatty acid having from 1 to 3 carbon atoms per molecule, said double salt having both chlorine and organic acid radicals linked directly to the metal and said metal being at least one of the group consisting of aluminum and titanium.

2. Process according to claim 1 in which said catalyst is a chlor titanium acetate having one to two acetate groups per molecule, the remaining titanium valences being satisfied by chlorine.

3. Process according to claim 1 in which said catalyst is a double salt of aluminum and titanium with chlorine and acetic acid.

4. Process according to claim 1 in which said catalyst is $(CH_3COO)_3TiAlCl_4$.

DAVID W. YOUNG.
HENRY B. KELLOG.

REFERENCES CITED

The following references are of record in the file of this patent:

UNITED STATES PATENTS

| Number | Name | Date |
|---|---|---|
| 1,542,264 | Norris | June 16, 1925 |
| 1,656,575 | Stone | Jan. 17, 1928 |
| 1,671,517 | Edeleanu | May 29, 1928 |
| 2,085,535 | Langedijk | June 29, 1937 |
| 2,142,980 | Huijser | Jan. 3, 1939 |
| 2,181,640 | Deanesly | Nov. 28, 1939 |
| 2,376,090 | Schulze | May 15, 1945 |

FOREIGN PATENTS

| Number | Country | Date |
|---|---|---|
| 106,371 | Australia | Jan. 26, 1939 |
| 347,606 | Germany | Jan. 23, 1922 |
| 793,226 | France | Jan. 20, 1936 |